Reissued Sept. 16, 1930

Re. 17,804

UNITED STATES PATENT OFFICE

DERIC WILLIAM PARKES, OF RYDERS GREEN, WEST BROMWICH, ENGLAND, ASSIGNOR OF ONE-HALF TO HERBERT WILLIAM ROBINSON, OF BIRMINGHAM, ENGLAND

PROCESS OF PRODUCING SOLUBLE LEAD REAGENTS

No Drawing. Original No. 1,740,312, dated December 17, 1929, Serial No. 316,365, filed October 31, 1928, and in Great Britain February 17, 1928. Application for reissue filed July 14, 1930. Serial No. 467,983.

This invention relates to processes for dissolving lead chloride. It is known that lead chloride is very slightly soluble in water, and is rather more soluble in sodium acetate solution, but that it is extremely difficult to dissolve more than about 5 per cent. of lead chloride in a solution of sodium acetate. On the other hand, in certain chemical processes it is often desirable to use lead chloride, for example as a reagent, but in practice great difficulty is encountered in causing the lead chloride to dissolve in or enter into the reacting solution. The object of the present invention is to produce a solution containing a much larger quantity of lead chloride than has been possible hitherto, and to do this by an extremely simple process.

According to the present invention, lead chloride and an alkali acetate are heated in water with the addition of a relatively small quantity of a suitable acid capable of forming a lead salt soluble in alkali acetate solutions. Nitric acid and acetic acid are found to give very good results. However, quite good results are also obtained with hydrochloric acid and citric acid, while acids such as tartaric acid and sulphuric acid serve to increase the amount of lead chloride which will enter into solution, but the results obtained with these last two acids are not as good as those obtained with the acids mentioned immediately above. It is also found that particularly good results are obtained by employing sodium acetate as the alkali acetate.

It is preferred to add this acid after heating the mixture of lead chloride and acetate to between 80° and 90° C., and it is found that a product is formed which is a clear solution at that temperature but which becomes cloudy on cooling down to about 50° C. and then clears again on re-heating.

In order that the nature of the invention and the manner in which it is to be performed may be more clearly understood, examples of some processes carried out in accordance therewith will now be given.

In one process, 46 parts by weight of lead chloride are mixed with 38 parts by weight of sodium acetate crystals and 15 parts by weight of water and heated to about 85° C.; 0.78 by weight of nitric acid of specific gravity 1.42 are then added and a clear solution results.

In another process, the amounts of lead chloride, sodium acetate, and water taken, and the temperatures employed, are the same as those in the preceding example, but 1.09 parts by weight of citric acid crystals are added in place of the nitric acid, and again a clear solution is obtained.

In yet another process, 20 parts of lead chloride, 25 parts of sodium acetate, and 10 parts of water, all the parts being measured by weight, are mixed together and heated with the addition of 0.58 parts of hydrochloric acid of specific gravity 1.16 to about 60° C. It is found that this solution, which contains 36 per cent. of lead chloride, remains liquid down to 24° C.

The solution may be employed in any cases where lead chloride is to be used as a reagent, but it is particularly applicable in the treatment of ammonia liquors for the recovery of catechols, as set forth in the specification of my pending patent application, Serial No. 296,418, filed on the 30th of July, 1928.

Having thus described my invention what I claim as new, and desire to secure by Letters Patent, is:—

1. The method of dissolving lead chloride which consists in adding acid to a hot mixture of lead chloride, alkali metal acetate and water, said acid being one which forms salts of lead soluble in alakali metal acetate solutions.

2. The method of making a solution containing lead chloride which consists in heating lead chloride and an alkali metal acetate in water with the addition of a relatively small quantity of an acid, which forms salts of lead soluble in alkali metal acetate solution.

3. The method of making a solution containing lead chloride which consists in heating lead chloride and sodium acetate in water with the addition of a relatively small quantity of an acid which forms salts of lead soluble in alkali metal acetate solution.

4. The method of making a solution containing lead chloride which consists in heating lead chloride and an alkali metal acetate in water with the addition of a relatively small quantity of nitric acid.

5. The method of making a solution containing lead chloride which consists in heating lead chloride and sodium acetate in water with the addition of a relatively small quantity of nitric acid.

6. The method of making a solution containing lead chloride which consists in heating lead chloride and an alkali metal acetate in water with the addition of a relatively small quantity of an acid capable of reacting with lead to produce a soluble salt.

7. The method of making a solution containing lead chloride which consists in mixing together lead chloride, an alkali metal acetate and water, heating the mixture thus formed and adding to said heated mixture a relatively small quantity of an acid which forms salts of lead soluble in alkali metal acetate solution.

8. The method of making a solution containing lead chloride which consists in mixing together lead chloride, sodium acetate and water, heating the mixture thus formed to a temperature between 80 and 100 degrees centigrade, and adding to said heated mixture a relatively small quantity of an acid which forms salts of lead soluble in alkali metal acetate solution.

9. The method of making a solution containing lead chloride which consists in mixing together lead chloride, sodium acetate and water, heating the mixture thus formed and adding to said heated mixture a quantity of an acid equal to about 1 per cent. of said mixture, said acid being one which forms salts of lead soluble in alkali metal acetate solutions.

10. The method of making a solution containing lead chloride which consists in heating a mixture of lead chloride, an alkali metal acetate and water with the addition of a quantity of an acid equal to about 1 per cent. of said mixture, said acid being one which forms salts of lead soluble in alkali metal acetate solutions.

DERIC WILLIAM PARKES.